United States Patent
Li et al.

(10) Patent No.: US 11,924,194 B2
(45) Date of Patent: Mar. 5, 2024

(54) METHOD AND APPARATUS FOR MONITORING DIGITAL CERTIFICATE PROCESSING DEVICE, AND DEVICE, MEDIUM, AND PRODUCT

(71) Applicant: ANTPOOL TECHNOLOGIES LIMITED, Hong Kong (CN)

(72) Inventors: Xuan Li, Beijing (CN); Rui Wu, Beijing (CN)

(73) Assignee: ANTPOOL TECHNOLOGIES LIMITED, HongKong (CN)

(*) Notice: Subject to any disclaimer, the term of this patent is extended or adjusted under 35 U.S.C. 154(b) by 282 days.

(21) Appl. No.: 17/613,840

(22) PCT Filed: May 24, 2019

(86) PCT No.: PCT/CN2019/088380
§ 371 (c)(1),
(2) Date: Nov. 23, 2021

(87) PCT Pub. No.: WO2020/237433
PCT Pub. Date: Dec. 3, 2020

(65) Prior Publication Data
US 2022/0247735 A1 Aug. 4, 2022

(51) Int. Cl.
*H04L 9/40* (2022.01)

(52) U.S. Cl.
CPC ........ *H04L 63/0823* (2013.01); *H04L 63/108* (2013.01); *H04L 63/1425* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 2010/0190469 | A1* | 7/2010 | Vanderveen | H04L 63/126 455/406 |
| 2013/0232258 | A1 | 9/2013 | Bullock et al. | |

FOREIGN PATENT DOCUMENTS

| | | |
|---|---|---|
| CN | 103368755 A | 10/2013 |
| CN | 108390793 A | 8/2018 |
| CN | 109257564 A | 1/2019 |
| CN | 109709936 A | 5/2019 |
| CN | 109711027 A | 5/2019 |

OTHER PUBLICATIONS

The World Intellectual Property Organization (WIPO) International Search Report for PCT/CN2019/088380 dated Feb. 26, 2020 5 Pages (including translation).

* cited by examiner

Primary Examiner — Cai Y Chen
(74) Attorney, Agent, or Firm — ANOVA LAW GROUP, PLLC (57) ABSTRACT

A monitoring method includes obtaining identification information of a digital certificate processing device, establishing a connection with the digital certificate processing device according to the identification information, sending monitoring information to the digital certificate processing device, receiving operation data fed back according to the monitoring information, and monitoring an operation status of the digital certificate processing device according to the operation data.

20 Claims, 3 Drawing Sheets

METHOD AND APPARATUS FOR MONITORING DIGITAL CERTIFICATE PROCESSING DEVICE, AND DEVICE, MEDIUM, AND PRODUCT

CROSS-REFERENCE TO RELATED APPLICATION

This application is a National Stage Entry under 35 U.S.C. § 371 of International Application No. PCT/CN2019/088380, filed May 24, 2019, the entire content of which is incorporated herein by reference.

TECHNICAL FIELD

The present disclosure relates to the field of computer device monitoring and, more particularly, to a method for monitoring a digital certificate processing device, and an apparatus for monitoring a digital certificate processing device, a monitoring device, a storage medium, and a computer program product.

BACKGROUND

With the global development of digital certificates, more and more users have purchased digital certificate processing devices and joined the team of processing digital certificate. When a user is in possession of a plurality of digital certificate processing devices, manpower is needed to monitor each digital certificate processing device, which is time-consuming and laborious, and timely monitoring of the operation of each digital certificate processing device is impossible.

SUMMARY

The present disclosure aims to solve one of the technical problems in the existing technologies.

Embodiments in the first aspect of the present application provide a digital certificate processing device monitoring method, which can realize monitoring and management of operation of digital certificate processing devices, so that users can timely and efficiently learn about the operation status of the digital certificate processing devices.

Embodiments in the second aspect of the present application provide a digital certificate processing device monitoring apparatus.

Embodiments in the third aspect of the present application provide a monitoring device.

Embodiments in the fourth aspect of the present application also provide a monitoring device.

Embodiments in the fifth aspect of the present application provide a computer-readable storage medium.

Embodiments in the sixth aspect of the present application provide a computer program product.

In order to solve the above problem, embodiments in the first aspect of the present application provide a digital certificate processing device monitoring method, where there are a plurality of digital certificate processing devices. The method includes obtaining identification information of each digital certificate processing device; establishing a connection with the corresponding digital certificate processing device according to the identification information, and sending monitoring information to the corresponding digital certificate processing device; receiving operation data fed back according to the monitoring information; monitoring an operation status of the corresponding digital certificate processing device according to the operation data.

According to the digital certificate processing device monitoring method of embodiments of the present application, for a plurality of digital certificate processing devices, a connection is established with each digital certificate processing device through identification information, and an operation status of each digital certificate processing device is monitored based on operation data fed back by the digital certificate processing device. As such, independent monitoring and management of a plurality of digital certificate processing devices can be realized, which, compared to the manual monitoring of the plurality of digital certificate processing devices, saves time and effort, and is convenient for users to learn about the operation of each digital certificate processing device in a timely and efficient manner.

In some embodiments, obtaining the identification information of each digital certificate processing device includes automatically obtaining the identification information of each digital certificate processing device; or generating the identification information of each digital certificate processing device according to an input instruction.

In some embodiments, the identification information includes an IP address.

In some embodiments, the operation data includes at least one of computing power information, chip temperature information, heat dissipation information, or computing power board operation information of the digital certificate processing device.

In some embodiments, monitoring the operation status of the corresponding digital certificate processing device according to the operation data includes determining whether the digital certificate processing device is operating normally according to the operation data; storing operation data corresponding to the digital certificate processing device in response to the digital certificate processing device operating normally; or sending prompt information in response to the digital certificate processing device operating abnormally.

In some embodiments, sending the prompt information includes sending the prompt information via at least one of an email, a text message, or a prompt message.

In some embodiments, the method further includes generating a report including the operation status of each digital certificate processing device according to the operation data, and sending the report.

To solve the above problem, embodiments in the second aspect of the present application provide a digital certificate processing device monitoring apparatus, where there are a plurality of digital certificate processing devices. The method apparatus includes an obtaining module configured to obtain identification information of the digital certificate processing devices; a sending module configured to establish a connection with the corresponding digital certificate processing device according to the identification information, and send monitoring information to the corresponding digital certificate processing device; a reception module configured to receive operation data fed back according to the monitoring information; a monitoring module configured to monitor an operation status of the corresponding digital certificate processing device according to the operation data.

The digital certificate processing device monitoring apparatus according to embodiments of the present application, for a plurality of digital certificate processing devices, establishes a connection with each digital certificate processing device via identification information, and monitors an operation status of each digital certificate processing device based on operation data fed back by the digital certificate processing device. As such, independent monitoring and management of a plurality of digital certificate processing devices can be realized, which, compared to the manual monitoring of the plurality of digital certificate processing devices, saves time and effort, and is convenient for users to learn about the operation of each digital certificate processing device in a timely manner.

In some embodiments, when obtaining the identification information of the digital certificate processing devices, the obtaining module is configured to automatically obtain the identification information of each digital certificate processing device; or generate the identification information of each digital certificate processing device according to an input instruction.

In some embodiments, the identification information includes an IP address.

In some embodiments, the operation data includes at least one of computing power information, chip temperature information, heat dissipation information, or computing power board operation information of the digital certificate processing device.

In some embodiments, when monitoring the operation status of the digital certificate processing device, the monitoring module is configured to determine whether the digital certificate processing device is operating normally according to the operation data, store operation data corresponding to the digital certificate processing device in response to the digital certificate processing device operating normally, or send prompt information in response to the digital certificate processing device operating abnormally.

In some embodiments, when sending the prompt information, the monitoring module is configured to send the prompt information via at least one of an email, a text message, or a prompt message.

In some embodiments, the apparatus further includes a generation module configured to generate a report including the operation status of each digital certificate processing device according to the operation data, and send the report.

A monitoring device provided by embodiments in the third aspect of the present application includes a display apparatus for displaying operation status information of digital certificate processing devices; an input apparatus for receiving input instructions; the digital certificate processing device monitoring apparatus connected to the display apparatus and the input apparatus, and configured to monitor the digital certificate processing devices according to the input instructions.

According to the monitoring device of embodiments of the present application, via the use of the digital certificate processing device monitoring apparatus, independent monitoring and management of digital certificate processing devices can be realized, which saves time and effort, and is convenient for users to learn about the operation of each digital certificate processing device in a timely and efficient manner.

A monitoring device provided by embodiments in the fourth aspect of the present application includes at least one processor; and a memory in communication connection with the at least one processor; where the memory stores instructions executable by the at least one processor, and the instructions, when executed by the at least one processor, cause the at least one processor to perform the digital certificate processing device monitoring method.

A computer-readable storage medium provided by embodiments in the fifth aspect of the present application stores computer-executable instructions, and the computer-executable instructions are configured to perform the digital certificate processing device monitoring method.

A computer program product provided by embodiments in the sixth aspect of the present application includes a computer program stored on a computer-readable storage medium, where the computer program includes program instructions that, when executed by a computer, cause the computer to perform the digital certificate processing device monitoring method.

Additional aspects and advantages of the present disclosure will partly be provided in the following description, partly become obvious from the following description, or be understood via practice of the present disclosure.

BRIEF DESCRIPTION OF THE DRAWINGS

The above and/or additional aspects and advantages of the present disclosure will become obvious and easy to understand from the description of the embodiments in conjunction with the following drawings.

REFERENCE NUMERALS

Monitoring device 1000;
Digital certificate processing device monitoring apparatus 100;
Obtaining module 10, sending module 20, reception module 30, monitoring module 40, generation module 50;
Display apparatus 200, input apparatus 300, processor 400, memory 500, communication interface 600, bus 700.

DETAILED DESCRIPTION OF THE EMBODIMENTS

Embodiments of the present disclosure are described in detail below. Examples of the embodiments are shown in the drawings, in which same or similar reference numerals indicate same or similar elements or elements with same or similar functions. The embodiments described below with reference to the drawings are exemplary, and are only used to explain the present disclosure, but should not be construed as limiting the present disclosure.

For a more detailed understanding of features and technical contents of the embodiments of the present disclosure, implementations of the embodiments of the present disclosure are described in detail below with reference to the drawings. The drawings are for reference only and are not used to limit the embodiments of the present disclosure. In the technical descriptions below, for the convenience of explanation, details are used to provide a sufficient understanding of the disclosed embodiments. However, one or more embodiments can still be implemented even without these details. In other situations, for simplification of the drawings, well-known structures and devices may be simplified for display.

The method for monitoring a digital certificate processing device according to embodiments in the first aspect of the present application will be described below with reference to the drawings, where there are a plurality of digital certificate processing devices, such as a plurality of digital certificate processing devices of a user. Via the method of the present application, operation of a plurality of digital certificate processing devices can be monitored in real time, and the user can be notified, so that the user can conveniently and timely learn about the operation status of each digital certificate processing device.

Figure 1:
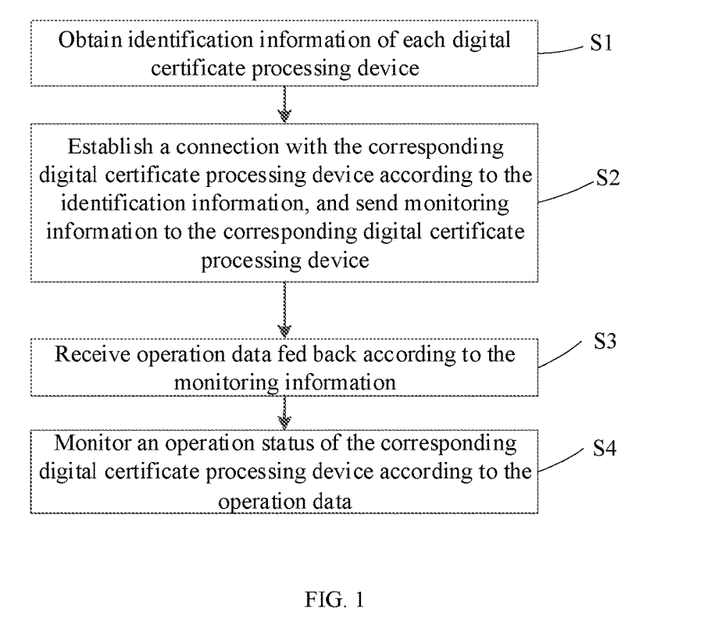
FIG. 1 is a flowchart of a digital certificate processing device monitoring method according to an embodiment of the present disclosure.

FIG. 1 is a flowchart of a digital certificate processing device monitoring method according to an embodiment of the present application. As shown in FIG. 1, the digital certificate processing device monitoring method of embodiments of the present application includes process S1, process S2, process S3, and process S4.

S1, obtaining identification information of each digital certificate processing device.

In some embodiments, the identification information of the digital certificate processing device includes information that can uniquely identify a network address of the digital certificate processing device when a network connection is being established, for example, a network protocol address, a set identification code. In some embodiments, the identification information includes an IP address (Internet Protocol Address).

In some embodiments, an automatic obtaining mode can be set to automatically obtain the identification information of the digital certificate processing device, such as the IP address, which is convenient and fast, and has a low error rate; or it is manually input and the identification, such as IP address, of each monitored digital certificate processing device is generated according to a user input instruction.

S2, establishing a connection with the corresponding digital certificate processing device according to the identification information, and sending monitoring information to the corresponding digital certificate processing device.

For example, an IP address is obtained according to an input instruction or the IP address of each digital certificate processing device is automatically obtained, an IP address list of the plurality of digital certificate processing devices is generated, a connection with each digital certificate processing device is established according to the corresponding IP address, and monitoring information, such as a request instruction to obtain operation data, is sent to each digital certificate processing device.

S3, receiving operation data fed back according to the monitoring information.

In some embodiments, when receiving an instruction of the monitoring information, the digital certificate processing device feeds back the operation data, such as at least one of computing power information, chip temperature information, heat dissipation information, or computing power board operation information, to a monitoring device.

S4, monitoring an operation status of the corresponding digital certificate processing device according to the operation data.

In some embodiments, a digital certificate processing device performs data processing related to a digital certificate. Thus, users often wish to know the computing power of the digital certificate processing device and information related to the computing power. Current operation status of the digital certificate processing device can be determined via the operation data that is fed back.

For example, computing power summary and computing power integration situation of the plurality of digital certificate processing devices can be determined, and the computing power can be refreshed in real-time, based on the computing power information; whether heat dissipation is normal and whether the chip temperature is too high or too low that affects the computing power can be learned about based on the chip temperature information and the heat dissipation information; whether the computing power, power supply, connection, etc., of each chip is balanced or effective can be determined according to the computing power board operation information. Therefore, the operation status of each digital certificate processing device can be monitored based on the operation data.

According to the digital certificate processing device monitoring method of embodiments of the present application, for a plurality of digital certificate processing devices, a connection is established with each digital certificate processing device through identification information, and an operation status of each digital certificate processing device is monitored based on operation data fed back by the digital certificate processing device. As such, independent monitoring and management of a plurality of digital certificate processing devices can be realized, which, compared to the manual monitoring of the plurality of digital certificate processing devices, saves time and effort, and is convenient for users to learn about the operation of each digital certificate processing device in a timely and efficient manner.

Further, in some embodiments, type and status of the digital certificate processing device can be identified according to the operation data, and whether the digital certificate processing device is operating normally can be determined according to the operation data. If the digital certificate processing device operates normally, the operation data corresponding to the digital certificate processing device is stored, which can then be viewed by users. Or, if the digital certificate processing device operates abnormally, prompt information can be sent. For example, whether the digital certificate processing device is operating normally can be determined according to the computing power information. If it is abnormal, for example, the computing power is greatly reduced, the operation situation of the digital certificate processing device can be sent to the user. In some embodiments, the prompt information can be sent via at least one of an email, a text message, or a prompt message. As such, the user can learn about the abnormal situation of the digital certificate processing equipment in time, and take further remedial measures to reduce losses.

In order for the user to learn about more detailed operation status of each digital certificate processing device in time, in some embodiments, a report including the operation status of each digital certificate processing device can be generated based on the operation data, and the report can be sent. In some embodiments, the report can include various types of operation data of each digital certificate processing device and determination results regarding operation status based on the operation data, such as whether the computing power is normal, whether the heat dissipation or temperature is normal, etc. The report can be sent to a mobile terminal of the user, such as a smart phone, a tablet computer, etc., such that the user can view it anytime and anywhere.

For example, the monitoring device automatically obtains the IP addresses of a plurality of digital certificate processing devices according to an input instruction or automatically, connects to the user's digital certificate processing devices via the IP addresses, and can access the plurality of digital certificate processing devices in a plurality of threads to obtain operation data fed back by each of the digital certificate processing device, determine type and operation status of the digital certificate processing device based on the operation data, generate a form containing operation parameters and operation status of each digital certificate processing device, where the form records normal status and abnormal status, and write the form into a database. The user can view the operation status of the corresponding digital certificate processing device on a page. If it is determined according to the operation data that the operation status of the digital certificate processing device is abnormal, such as the computing power is below a threshold, the chip temperature is too high, then an alarm is provided, for example, a pop-up window is displayed on an interactive interface of the monitoring device or a text message or email is sent to the user end, and the user can take further measures to eliminate the abnormality, which improves efficiency. The monitoring device can perform the above processes in real time or every preset period of time.

In summary, the digital certificate processing device monitoring method according to embodiments of the present application can realize independent monitoring of the operation status of each of a plurality of digital certificate processing devices, so that a user can view the operation data, operation status, and computing power summary of the digital certificate processing devices, as well as the functions of computing power integration and real-time refreshing of the computing power of the plurality of digital certificate processing devices, enabling the user to monitor and manage the plurality of digital certificate processing devices, and saving time and effort.

A digital certificate processing device monitoring apparatus according to embodiments in the second aspect of the present application is described below with reference to the drawings.

Figure 2:
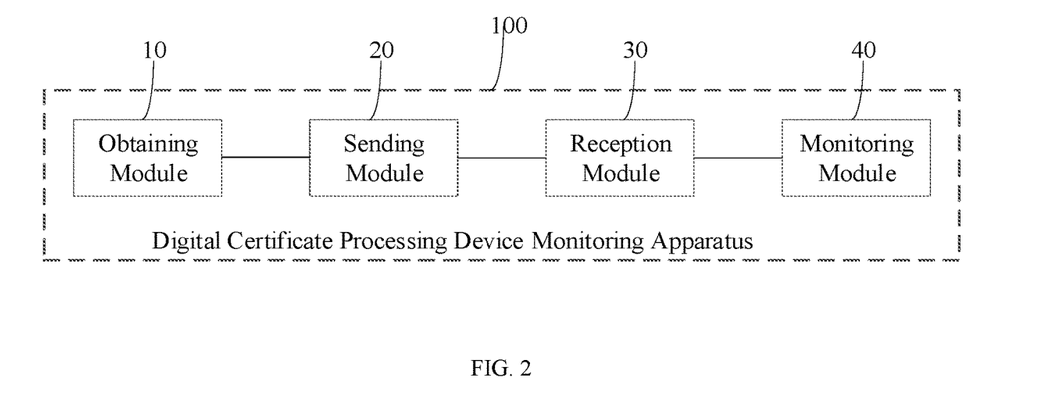
FIG. 2 is a block diagram of a digital certificate processing device monitoring apparatus according to an embodiment of the present disclosure.

FIG. 2 shows a digital certificate processing device monitoring apparatus according to an embodiment of the present application. As shown in FIG. 2, a digital certificate processing device monitoring apparatus 100 according to embodiments of the present application includes an obtaining module 10, a sending module 20, a reception module 30, and a monitoring module 40.

The obtaining module 10 is configured to obtain identification information of digital certificate processing devices, for example, automatically obtaining the identification information, such as IP address, of each digital certificate processing device, or generating the identification information, such as IP address, of each digital certificate processing device according to a user input instruction.

The sending module 20 is configured to establish a connection with the corresponding digital certificate processing device according to the identification information, such as the IP address, and send monitoring information to the corresponding digital certificate processing device.

The reception module 30 is configured to receive operation data fed back according to the monitoring information.

The monitoring module 40 is configured to monitor an operation status of the corresponding digital certificate processing device according to the operation data.

The digital certificate processing device monitoring apparatus 100 according to embodiments of the present application, for a plurality of digital certificate processing devices, establishes a connection with each digital certificate processing device via identification information, and monitors an operation status of each digital certificate processing device based on operation data fed back by the digital certificate processing device. As such, independent monitoring and management of a plurality of digital certificate processing devices can be realized, which, compared to the manual monitoring of the plurality of digital certificate processing devices, saves time and effort, and is convenient for users to learn about the operation of each digital certificate processing device in a timely manner.

In some embodiments, the operation data can include at least one of computing power information, chip temperature information, heat dissipation information, or computing power board operation information of the digital certificate processing device. When monitoring a digital certificate processing device, the monitoring module 40 determines whether the digital certificate processing device is operating normally according to the operation data, stores operation data corresponding to the digital certificate processing device in response to the digital certificate processing device operating normally so that the user can view on a page to learn about the operation of the digital certificate processing device, or send prompt information in response to the digital certificate processing device operating abnormally. In some embodiments, the monitoring module 40 can send the prompt information via at least one of an email, a text message, or a prompt message. As such, the user can learn about the abnormal situation of the digital certificate processing equipment in time, and take further remedial measures to reduce losses.

Figure 3:
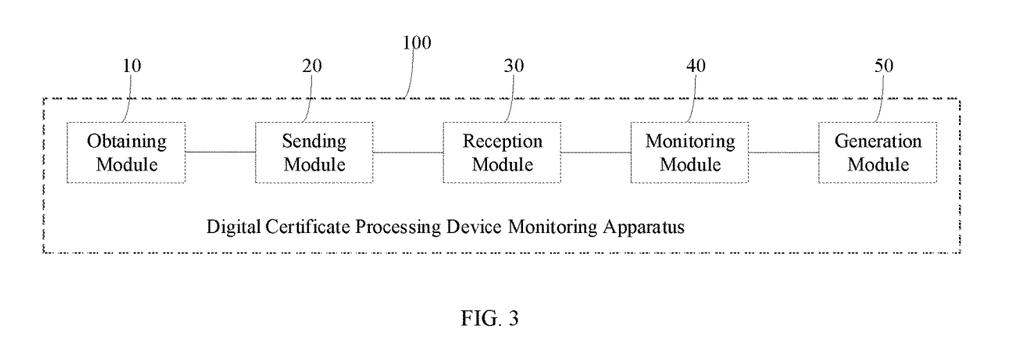
FIG. 3 is a block diagram of a digital certificate processing device monitoring apparatus according to another embodiment of the present disclosure.

In some embodiments, as shown in FIG. 3, the digital certificate processing device monitoring apparatus 100 according to embodiments of the present application further includes a generation module 50 configured to generate a report including the operation status of each digital certificate processing device according to the operation data, and send the report. In some embodiments, the report can contain various operation data of each digital certificate processing device and the determination result of the operation status based on the operation data, for example, determination of whether the computing power is normal, whether the heat dissipation or the temperature is normal, etc., and the report can be sent to the user's mobile terminal such as a smart phone, a tablet computer, etc., so that the user can view it anytime and anywhere.

A monitoring device according to embodiments in the third aspect of the present application is described below with reference to the drawings.

Figure 4:
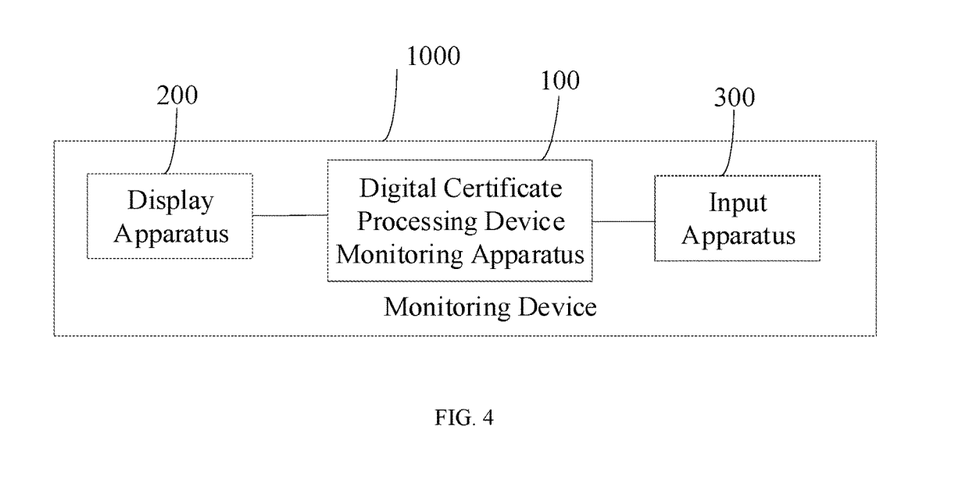
FIG. 4 is a block diagram of a monitoring device according to an embodiment of the present disclosure.

FIG. 4 is a block diagram of a monitoring device according to an embodiment of the present application. As shown in FIG. 4, a monitoring device 1000 according to embodiments of the present application includes the digital certificate processing device monitoring apparatus 100, a display apparatus 200, and an input apparatus 300.

The display apparatus 200 is configured to display operation status information of digital certificate processing devices. The input apparatus 300 is configured to receive input instructions. The display apparatus 200 and the input apparatus 300 are coupled to the digital certificate processing device 100. The user can input identification information of a digital certificate processing device or set the mode of obtaining the identification information via the input apparatus 200, and the digital certificate processing device monitoring apparatus 100 can establish a connection with the digital certificate processing device by obtaining the identification information of the digital certificate processing device, obtain operation data, and determine operation status of the digital certificate processing device according to the operation data and perform monitoring and management. Reference can be made to the detailed description of the above embodiments.

The monitoring device 1000 according to embodiments of the present application, by adopting the digital certificate processing device monitoring apparatus of the above embodiments, can realize independent monitoring and management of the digital certificate processing devices, which saves time and effort, and facilitating users to learn about the operation of each digital certificate processing device in a timely and efficient manner.

Figure 5:
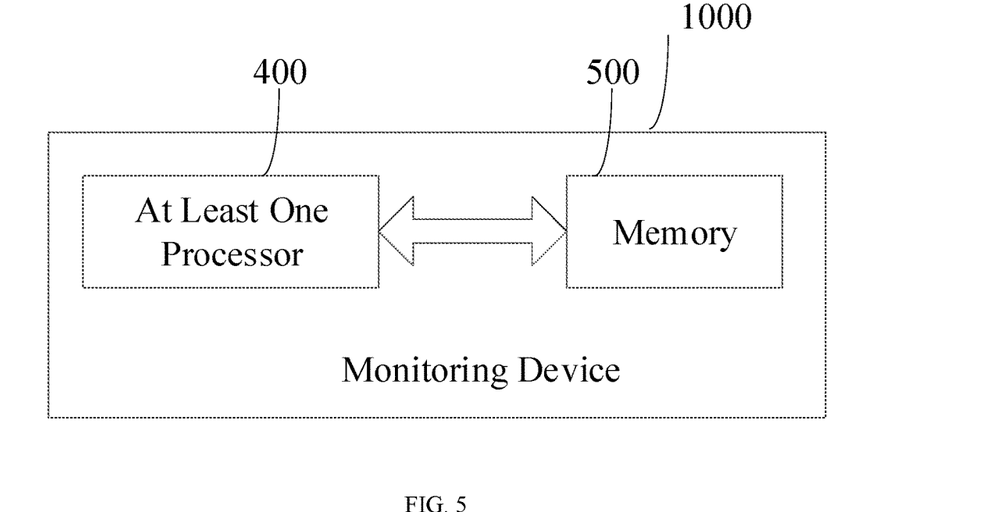
FIG. 5 is a block diagram of a monitoring device according to another embodiment of the present disclosure.

As shown in FIG. 5, the monitoring device 1000 of embodiments in the fourth aspect of the present application includes at least one processor 400 and a memory 500 in communication connection with the at least one processor 400. The memory 500 stores instructions that can be executed by the at least one processor 400. The instructions, when executed by the at least one processor 400, cause the at least one processor 400 to perform the digital certificate processing device monitoring method of the above embodiments.

In some embodiments, the monitoring device 1000 performs data processing related to digital certificates, and obtain the digital certificates via the data processing. Further, when the digital certificate is related to digital currency or is embodied as digital currency, the digital certificate processing device in embodiments of the present disclosure can be a digital currency mining machine, and the digital currency may be a cryptocurrency such as Bitcoin.

Figure 6:
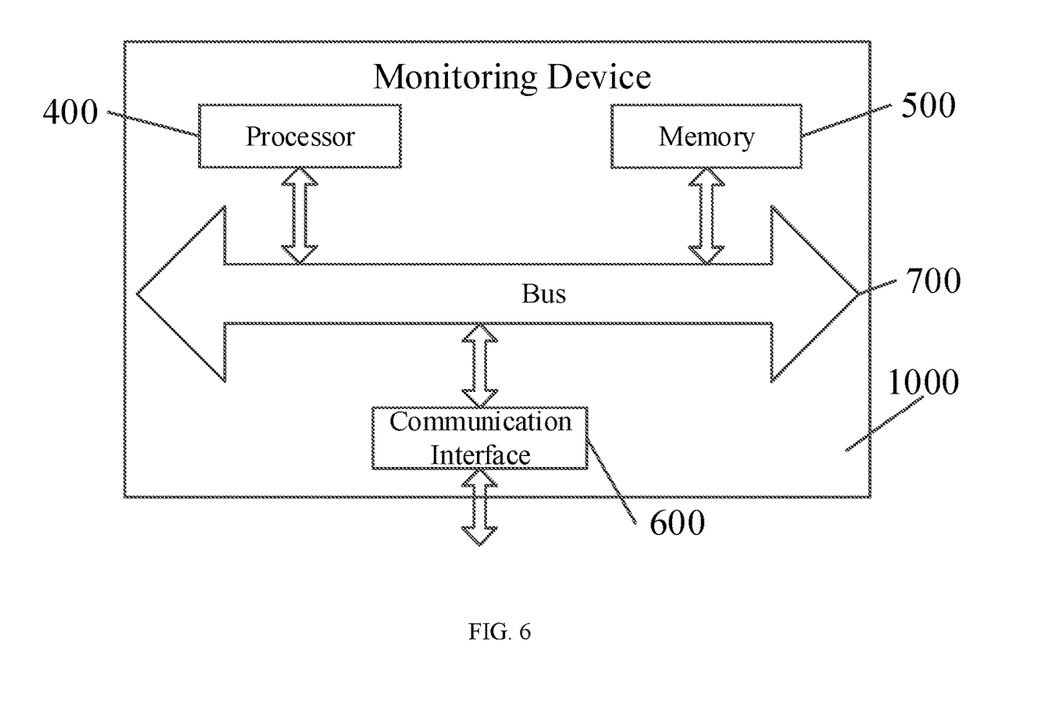
FIG. 6 is a block diagram of a monitoring device provided according to an embodiment of the present disclosure.

For example, FIG. 6 is a block diagram of a monitoring device according to an embodiment of the present application, where FIG. 6 shows one processor 400 and the memory 500 as an example. A communication interface 600 and a bus 700 are also included. The processor 400, the communication interface 600, and the memory 500 can communicate with each other via the bus 700. The communication interface 600 can be used for information transmission. The processor 400 can call logic instructions in the memory 500 to perform the digital certificate processing device monitoring method in the above embodiments.

In addition, the above logical instructions in the memory 500 can be implemented in the form of software functional units and, when sold or used as an independent product, can be stored in a computer-readable storage medium.

As a computer-readable storage medium, the memory 500 can be used to store a software program, a computer-executable program, such as program instructions/modules corresponding to the methods in embodiments of the present application. The processor 400 executes the software program, instructions, and modules stored in the memory 500 to perform functional applications and data processing, that is, implementing the digital certificate processing device monitoring method in the above method embodiments.

The memory 500 can include a program storage area and a data storage area. The program storage area can store an operation system and an application program needed by at least one function. The data storage area can store data created according to the use of a terminal device, etc. In addition, the memory 500 can include a high-speed random access memory, and can include a non-volatile memory.

A computer-readable storage medium of embodiments in the fifth aspect of the present application stores computer-executable instructions, and the computer-executable instructions are configured to execute the da digital to certificate processing device monitoring method of the above embodiments.

Embodiment in the sixth aspect of the present application provide a computer program product, which includes a computer program stored on a computer-readable storage medium. The computer program includes program instructions. The program instructions, when executed by a computer, cause the computer to perform the digital certificate processing device monitoring method of the above embodiment. The digital certificate processing device can be a mining machine.

The above computer-readable storage medium can be a transitory computer-readable storage medium or a non-transitory computer-readable storage medium.

Technical solutions of embodiments of the present application can be embodied in the form of a software product. The computer software product is stored on a storage medium and includes one or more instructions configured to enable a computer device (which can be a personal computer, a server, or a network device, etc.) to perform all or some of the processes of the method described in embodiments of the present disclosure. The above storage medium can be a non-transitory storage medium, including a medium that can store program codes, such as U disk, mobile hard disk, read-only memory (ROM), random access memory (RAM), magnetic disk, or optical disks, or can be a transitory storage medium.

In the present application, although terms "first," "second," etc. may be used to describe various elements, these elements should not be limited by these terms. These terms are only used to distinguish one element from another element. For example, without changing the meaning of the description, a first element can be referred to as second element, and similarly, the second element can be referred to as the first element, as long as all occurrences of "first element" are renamed consistently and all occurrences of "second component" are renamed consistently. The first element and the second element are both elements, but they may not be the same element.

Terms used in the present application are only used to describe the embodiments and are not used to limit the claims. As used in the description of the embodiments and claims, unless the context clearly indicates otherwise, "a," "an," and "the" in singular form are intended to also include plural form. Similarly, term "and/or" used in the present application refers to any and all possible combinations that include one or more associated items that are listed. In addition, when used in the present application, term "comprise" and its variants "comprises" and/or "comprising" and the like refer to the existence of stated feature, body, step, operation, element, and/or component, but do not exclude the existence or addition of one or more other features, bodies, steps, operations, elements, components, and/or groups thereof.

Various aspects, examples, implementations, or features in the described embodiments can be used alone or in any combination. Various aspects in the described embodiments can be implemented by software, hardware, or a combination of software and hardware. The described embodiments can be embodied by a computer-readable medium storing computer-readable codes, and the computer-readable codes include instructions executable by at least one computing device. The computer-readable medium can be associated with any data storage device capable of storing data, which can be read by a computer system. Examples of the computer-readable medium can include read-only memory, random access memory, CD-ROM, HDD, DVD, magnetic tape, optical data storage device, and the like. The computer-readable medium can be distributed in computer systems connected via a network, so that the computer-readable codes can be stored and executed in a distributed manner.

The drawings can be referred to for the above technical description, and form part of the present application, and via description, the drawings show implementations in accordance with the described embodiments. Although these embodiments are described in sufficient detail to enable those skilled in the art to implement these embodiments, these embodiments are non-limiting. As such, other embodiments can be used and various modifications can be made without departing from the scope of the described embodiments. For example, the sequence of operations described in a flowchart is non-limiting, hence the sequence of two or more operations illustrated in the flowchart and described according to the flowchart can be changed according to some embodiments. As another example, in some embodiments, one or more operations illustrated in a flowchart and described according to the flowchart are optional or can be deleted. In addition, some processes or functions can be added to the disclosed embodiments, or the orders of two or more processes can be swapped. All these modifications are considered to be included in the disclosed embodiments and claims.

In addition, terminology is used in the above technical description to provide a thorough understanding of the described embodiments. However, overly detailed details are not needed to implement the described embodiments. Therefore, the above description of the embodiments is presented for explanation and description. The embodiments presented in the above description and the examples disclosed according to these embodiments are provided separately to add context and help to understand the described embodiments. The above description is not intended to be exhaustive or to limit the described embodiments to the precise form of the present disclosure. Based on the above teachings, some modifications, options, and changes are feasible. In some situations, well-known processing steps are not described in detail to avoid unnecessarily affecting the described embodiments.

What is claimed is:

1. A monitoring method comprising:
   obtaining identification information of a digital certificate processing device;
   establishing a connection with the digital certificate processing device according to the identification information;
   sending monitoring information to the digital certificate processing device;
   receiving operation data fed back according to the monitoring information; and
   monitoring an operation status of the digital certificate processing device according to the operation data.

2. The method of claim 1, wherein obtaining the identification information of the digital certificate processing device includes:
   automatically obtaining the identification information of the digital certificate processing device; or
   generating the identification information of the digital certificate processing device according to an input instruction.

3. The method of claim 1, wherein the identification information includes an IP address.

4. The method of claim 1, wherein the operation data includes at least one of computing power information, chip temperature information, heat dissipation information, or computing power board operation information of the digital certificate processing device.

5. The method of claim 1, wherein monitoring the operation status of the digital certificate processing device according to the operation data includes:
   determining whether the digital certificate processing device is operating normally according to the operation data; and
   performing at least one of:
      storing the operation data in response to determining that the digital certificate processing device operates normally; or
      sending prompt information in response to determining that the digital certificate processing device operates abnormally.

6. The method of claim 5, wherein sending the prompt information includes sending the prompt information via at least one of an email, a text message, or a prompt message.

7. The method of claim 1, further comprising:
   generating a report including the operation status of the digital certificate processing device according to the operation data; and
   sending the report.

8. A monitoring device comprising:
   a processor; and
   a memory storing instructions that, when executed by the processor, cause the processor to:
      obtain identification information of a digital certificate processing device;
      establish a connection with the digital certificate processing device according to the identification information;
      send monitoring information to the digital certificate processing device;
      receive operation data fed back according to the monitoring information; and
      monitor an operation status of the digital certificate processing device according to the operation data.

9. The monitoring device of claim 8, wherein the instructions further cause the processor to, when obtaining the identification information of the digital certificate processing device:
   automatically obtain the identification information of the digital certificate processing device; or
   generate the identification information of the digital certificate processing device according to an input instruction.

10. The monitoring device of claim 8, wherein the identification information includes an IP address.

11. The monitoring device of claim 8, wherein the operation data includes at least one of computing power information, chip temperature information, heat dissipation information, or computing power board operation information of the digital certificate processing device.

12. The monitoring device of claim 8, wherein the instructions further cause the processor to, when monitoring the operation status of the digital certificate processing device:
   determine whether the digital certificate processing device is operating normally according to the operation data; and
   perform at least one of:
      storing operation data in response to determining that the digital certificate processing device operates normally; or
      sending prompt information in response to determining that the digital certificate processing device operates abnormally.

13. The monitoring device of claim 12, wherein the instructions further cause the processor to, when sending the prompt information, send the prompt information via at least one of an email, a text message, or a prompt message.

14. The monitoring device of claim 8, wherein the instructions further cause the processor to:
   generate a report including the operation status of the digital certificate processing device according to the operation data; and
   send the report.

15. The monitoring device of claim 8, further comprising:
   a display apparatus configured to display operation status information of the digital certificate processing device; and
   an input apparatus configured to receive an input instructions.

16. A non-transitory computer-readable storage medium storing computer-executable instructions that, when executed by a processor, cause the processor to:
   obtain identification information of a digital certificate processing device;
   establish a connection with the digital certificate processing device according to the identification information;
   send monitoring information to the digital certificate processing device;
   receive operation data fed back according to the monitoring information; and
   monitor an operation status of the digital certificate processing device according to the operation data.

17. The storage medium of claim 16, wherein the instructions further cause the processor to, when obtaining the identification information of the digital certificate processing device:
   automatically obtain the identification information of the digital certificate processing device; or
   generate the identification information of the digital certificate processing device according to an input instruction.

18. The storage medium of claim 16, wherein the identification information includes an IP address.

19. The storage medium of claim 16, wherein the operation data includes at least one of computing power information, chip temperature information, heat dissipation information, or computing power board operation information of the digital certificate processing device.

20. The storage medium of claim 16, wherein the instructions further cause the processor to, when monitoring the operation status of the digital certificate processing device:
   determine whether the digital certificate processing device is operating normally according to the operation data; and
   perform at least one of:
      storing operation data in response to determining that the digital certificate processing device operates normally; or
      sending prompt information in response to determining that the digital certificate processing device operates abnormally.

* * * * *